United States Patent
Azuma et al.

[11] Patent Number: 5,831,680
[45] Date of Patent: Nov. 3, 1998

[54] COLOR SIGNAL PROCESSING CIRCUIT CAPABLE OF PROCESSING PAL/NTSC COLOR TELEVISION SIGNALS WHICH PREVENTS IMAGE DETERIORIZATION CAUSED BY CHROMATIZATION

[75] Inventors: Kunihiko Azuma; Kenji Mori, both of Tokyo, Japan

[73] Assignee: NEC Corporation, Tokyo, Japan

[21] Appl. No.: 616,175

[22] Filed: Mar. 15, 1996

[30] Foreign Application Priority Data

Mar. 15, 1995 [JP] Japan ................................. 7-055470

[51] Int. Cl.⁶ .............................. H04N 9/45; H04N 9/70; H04N 9/64
[52] U.S. Cl. ..................... 348/506; 348/507; 348/643; 348/708
[58] Field of Search ......................... 348/500, 505–509, 348/536, 537, 539, 555, 557, 638–641, 643, 708, 713; H04N 9/45, 9/70, 9/64

[56] References Cited

U.S. PATENT DOCUMENTS 3,673,320   6/1972   Carnt et al. .............................. 348/507
3,772,461   11/1973  Horaguchi ............................... 348/643
4,688,082   8/1987   Kato ....................................... 348/555

FOREIGN PATENT DOCUMENTS

58-215888  12/1983  Japan .............................. H04N 9/46
62-42431   9/1987   Japan .............................. H04N 9/64

Primary Examiner—Mark R. Powell
Assistant Examiner—John W. Miller
Attorney, Agent, or Firm—Whitham, Curtis & Whitham

[57] ABSTRACT

In a color signal processing circuit capable of processing a PAL/NTSC color television signal, in order to prevent an image deterioration caused by chromatization when a PAL signal is received in an NTSC signal receiving mode, there is provided a gate control signal generating circuit for alternately generating gate control signals "GA" and "GK", one for one horizontal period and the other for a next one horizontal period, in response to application of a phase inverting pulse "R" which inverts in polarity every one horizontal period.

2 Claims, 6 Drawing Sheets

COLOR SIGNAL PROCESSING CIRCUIT CAPABLE OF PROCESSING PAL/NTSC COLOR TELEVISION SIGNALS WHICH PREVENTS IMAGE DETERIORATION CAUSED BY CHROMATIZATION

BACKGROUND OF THE INVENTION

1. Field of the Invention

The present invention relates to a color signal processing circuit, and more specifically to a color signal processing circuit capable of processing a PAL/NTSC color television signal.

2. Description of Related Art P Present Worldwide color television signals can be divided broadly into three systems of an NTSC system, a PAL system and an SECAM system, which include inherent features, respectively, and various television receivers each fitted to anyone of these systems are currently produced.

Of the three systems, the NTSC system and the PAL system are similar to each other in various points including a color signal modulation system and a color signal transmitting system, as compared with the SECAM system. For example, the color signal modulation system is an amplitude modulation in both of the NTSC system and the PAL system, but a frequency modulation in the SECAM system. Therefore, a color signal processing circuit for the NTSC system and a color signal processing circuit for the PAL system have many similar circuit constructions. Color signal processing circuits each capable of processing both the NTSC system signal and the PAL system signal have already been manufactured.

The color signal processing circuit has a function of regenerating a carrier by using a burst signal as a reference, so as to finally regenerate color signals. Constituents of the color signal processing circuit contain an APC (automatic phase control) detector and a killer detector. They have a function of preventing unnecessary coloration or chromatization when the burst signal is weak, and chromatization and achromatization is controlled on the basis of an output level of the killer detector. This color signal processing circuit is disclosed in for example Japanese Patent Publication No. JP-B-62-42431, which will be called a "prior art" hereinafter.

Figure 1:
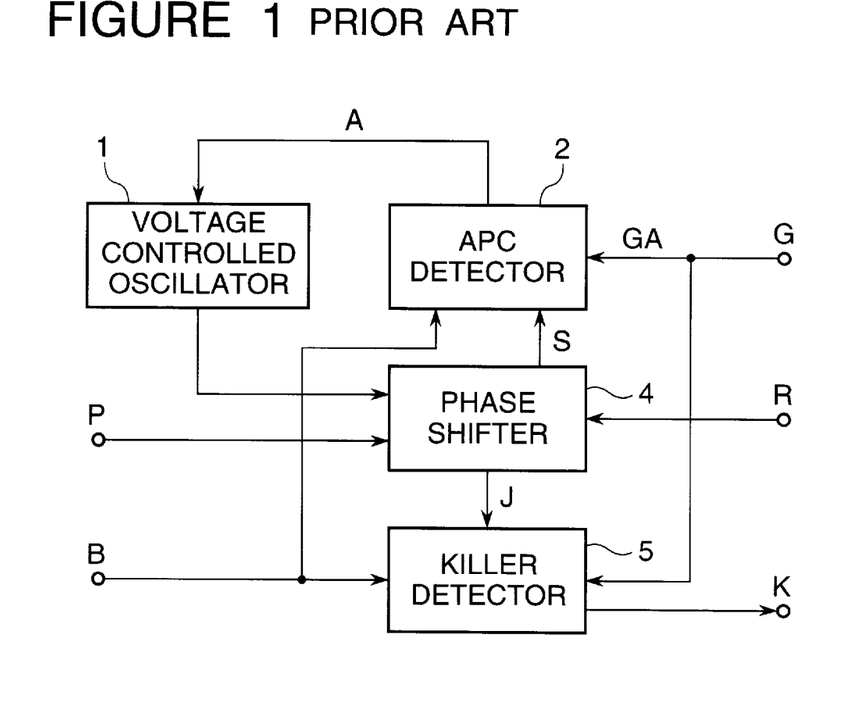
FIG. 1 is a block diagram illustrating one example of the color signal processing circuit of the prior art.

Referring to FIG. 1, which is a block diagram illustrating the color signal processing circuit of the prior art, this prior art circuit includes a voltage controlled oscillator 1 for generating an oscillation signal "O" having an oscillation frequency controlled by an APC detection signal "A", an APC detector 2 detecting a phase difference between a burst signal "B" and an APC input signal "S" in response to application of a gate pulse "G", for outputting the APC detection signal "A", a phase shifter 4 for outputting the APC input signal "S" phase-shifted from the burst signal "B" by −90°, and also for generating a killer input signal "J" by controlling a phase of a subcarrier, and a killer detector 5 detecting the killer input signal "J" in response to application of the burst signal "B", for outputting a killer detection signal "K".

Now, an operation of the color signal processing circuit of the prior art will be described with reference to FIG. 1. The burst signal "B" supplied through an input terminal TB is supplied to the APC detector 2 and the killer detector 5, which in turn receive the gate pulse "G" which is generated from a horizontal synchronizing signal and which is brought to a high level "H" only during a period of the burst signal "B", so that these circuits are controlled to operate only during the period of the burst signal "B". The APC detector 2 supplies the voltage controlled oscillator 1 with the APC detection signal "A" which is generated by detecting a phase difference between the burst signal "B" and the APC input signal "S", and in response to the APC detection signal "A", the voltage controlled oscillator 1 supplies the controlled oscillation signal "O" to the phase shifter 4. This phase shifter 4 outputs the APC input signal "S" which is shifted in phase from the burst signal "B" by −90°. Furthermore, in order to generate the killer input signal "J", the phase shifter 4 further phase-shifts the phase of the subcarrier shifted from the phase of the APC input signal "S" by +90°, by a PAL/NTSC switching signal "P" and a phase inverting pulse "R" which is supplied only when the switching signal "P" indicates the PAL system. As a result, in an NTSC signal receiving mode and in a PAL signal receiving mode, the phase shifter 4 outputs to the killer detector 5 as the killer input signal "J" the subcarrier which is phase-shifted from the phase of the APC input signal "S" by −45° and is the same phase as that of the APC input signal "S", respectively.

Figure 2:
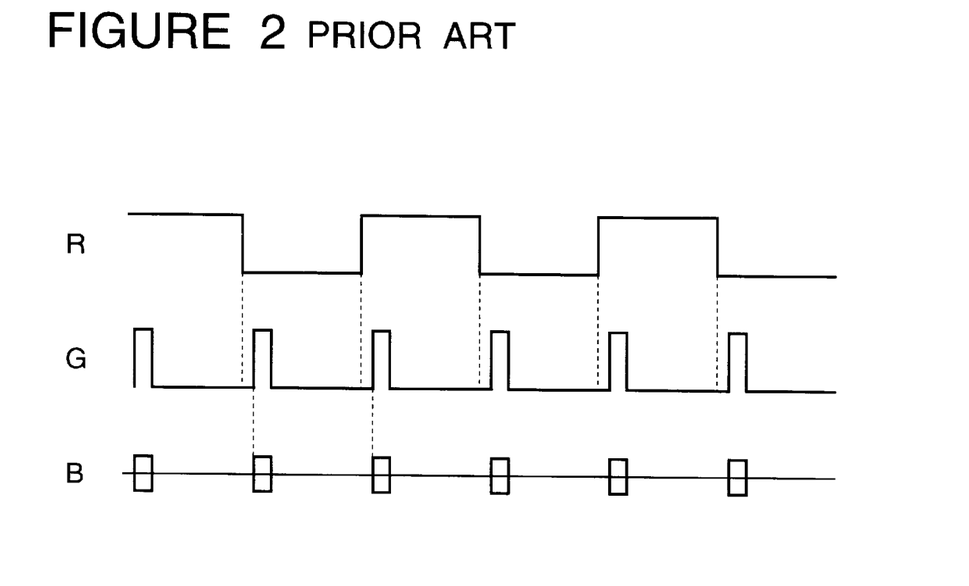
FIG. 2 is a time chart illustrating one example of an operation of the color signal processing circuit of the prior art.

Further referring to FIG. 2 which is a time chart of the phase inverting pulse "R", the gate pulse "G" and the burst signal "B", the phase inverting pulse "R" is inverted just before the rising edge of the gate pulse "G", and inverts the phase of the killer input signal "J" only when the phase inverting pulse "R" is at a low level "L".

During a period of the high level "H" of the gate pulse "G", the killer detector 5 seeks a cosine of a phase difference between the burst signal "B" and the killer input signal "J", and outputs a killer detection signal "K" obtained by causing the result of the cosine to pass on a smoothing capacitor so as to make it uniform.

Figure 3A:
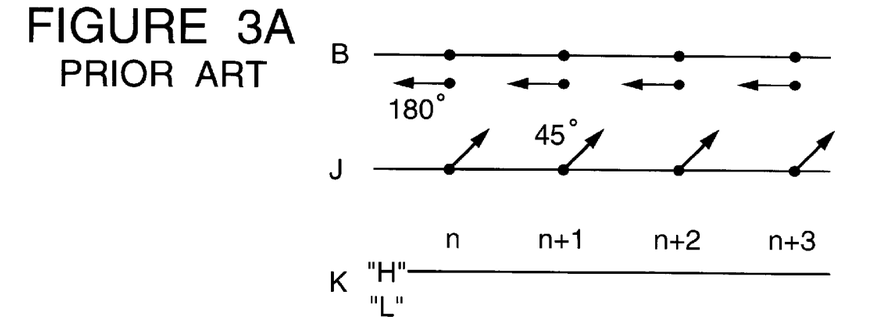
FIGS. 3A to 3D are operation diagrams illustrating different phase relations between various signals in the color signal processing circuit of the prior art.

Also referring to FIGS. 3A to 3D which are diagrams illustrating an operation of the killer detection, "n", "n+1", "n+2", * * * indicate an (n)th horizontal period, an (n+1)th horizontal period, an (n+2)th horizontal period, * * * , respectively. In FIG. 3A showing the case in that an NTSC signal is inputted in the NTSC signal receiving mode, since the phase of the burst signal "B" is always at a constant value of 180° for all the horizontal periods, the phase of the killer input signal "J" is also at a constant value of 45° for all the horizontal periods, so that the phase difference between these signals "B" and "J" is always at a constant value of 45°, and therefore, the killer detector 5 outputs the killer detection signal "K" of a high level "H".

Figure 3B:
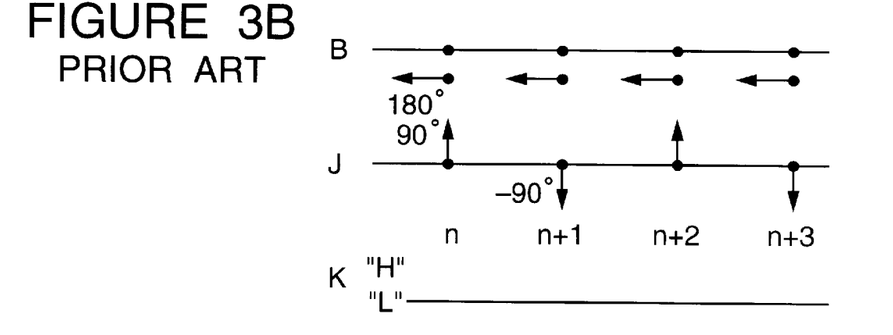

In FIG. 3B showing the case in that an NTSC signal is inputted in the PAL signal receiving mode, the phase of the burst signal "B" is always at a constant value of 180°, but the phase of the killer input signal "J" alternately assumes 90° and −90°, one for one horizontal period and the other for a next one horizontal period. Therefore, for both of the (n)th and (n+1)th horizontal periods, the signals "B" and "J" are orthogonal to each other, so that the killer detector 5 outputs the killer detection signal "K" of a high level "L".

Figure 3C:
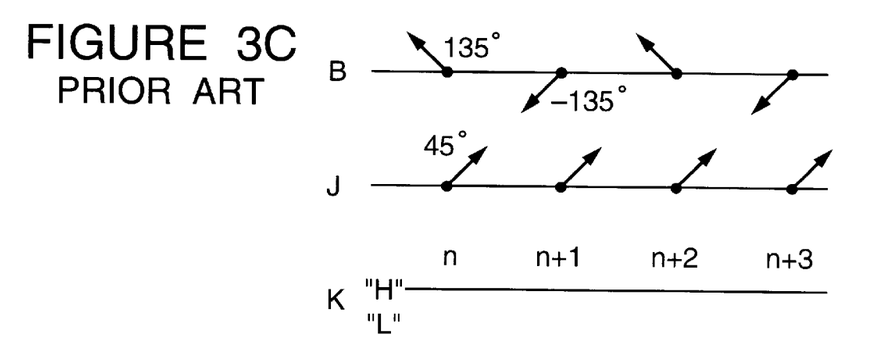

In FIG. 3C showing the case in that a PAL signal is inputted in the NTSC signal receiving mode, the phase of the burst signal "B" alternately assumes 135° and −135°, one for one horizontal period and the other for a next one horizontal period, but since the APC input signal "S" is locked to an averaged value of the burst signal "B", the phase of the APC signal "S" is always at 90°, so that the killer signal "J" is always 45° since it is in the NTSC signal receiving mode. Here, assuming that the phase of the (n)th burst signal "B" is 135°, the phase of the (n+1)th burst signal "B" becomes −135°, so that, during the (n)th horizontal period, the phase of the burst signal "B" and the phase of the killer input signal "J" are orthogonal to each other, but during the (n+1)th horizontal period, the phase of the burst signal "B" and the phase of the killer input signal "J" are opposite to each other. By causing the output to pass on a smoothing capacitor, the output level becomes uniform, so that the killer detector 5 outputs the killer detection signal "K" of a high level "H".

Figure 3D:
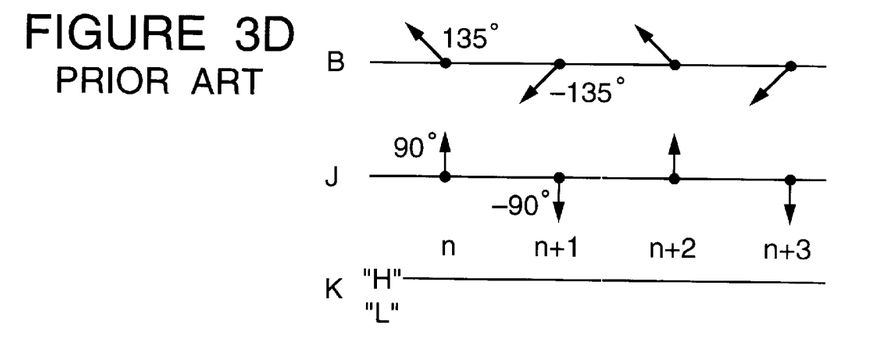

In FIG. 3D showing the case in that a PAL signal is inputted in the PAL signal receiving mode, the phase of the burst signal "B" alternately assumes 135° and −135°, one for one horizontal period and the other for a next one horizontal period, but similarly to the case shown in FIG. 3C, the phase of the APC signal "S" is always at 90°, so that the killer input signal "J" alternately assumes 90° and −90°, one for one horizontal period and the other for a next one horizontal period, since it is in the PAL signal receiving mode. Here, assuming that the phase of the (n)th burst signal "B" is 135° and the phase of the killer input signal "J" is 90°, the phase difference becomes 45°. In this case, the phase of the (n+1)th burst signal "B" becomes −135°, and the phase of the killer input signal "J" becomes −90°, so that the phase difference becomes −45°. Since they are of the same polarity, the output level becomes constant, so that the killer detector 5 outputs the killer detection signal "K" of a high level "H".

The above mentioned color signal processing circuit has the following disadvantage: When the PAL signal is inputted in the NTSC signal receiving mode, the output of the killer detector for control of chromatization and achromatization is brought to the high level "H", so that chromatization occurs because the circuit becomes similar to the case that the NTSC signal which is the same system as that of the receiving mode is inputted. Since the PAL signal is so configured that the (R-Y) component inverts from one horizontal period to another, the chromatization results in appearance of a horizontal striped pattern in a screen, so that the display screen becomes very unsightly.

SUMMARY OF THE INVENTION

Accordingly, it is an object of the present invention to provide a color signal processing circuit which has overcome the above mentioned defect of the prior art.

Another object of the present invention is to provide a color signal processing circuit preventing generation of the horizontal striped pattern.

The above and other objects of the present invention are achieved by a color signal processing circuit in accordance with the present invention comprising an APC detector detecting a phase difference between a burst signal and a first subcarrier in response to application of a first gate control signal, for outputting an APC detection signal; a voltage controlled oscillator for generating an oscillation signal having an oscillation frequency controlled in response to application of the APC detection signal; a phase shifter for outputting the first subcarrier in response to application of the oscillation signal and also for generating a second subcarrier having its phase orthogonal to that of the first subcarrier, and a killer detector for generating a killer detection signal which is a result of a calculation of a cosine of a phase difference between the second subcarrier and the burst signal in response to application of a second gate control signal, wherein there is provided a gate control signal generating circuit for alternately generating the first gate control signal and the second gate control signal, one for one horizontal period and the other for a next one horizontal period, in response to application of a phase inverting pulse which alternately inverts in its polarity from one horizontal period to another.

DESCRIPTION OF THE PREFERRED EMBODIMENT

Figure 4:
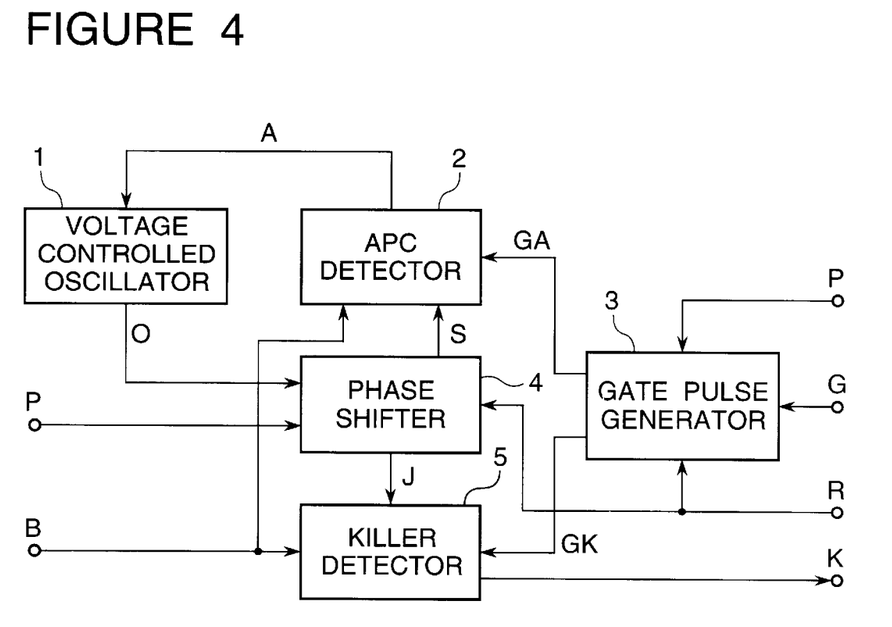
FIG. 4 is a block diagram of one embodiment of the color signal processing circuit in accordance with the present invention.

Now, referring to FIG. 4 which is a block diagram of one embodiment of the color signal processing circuit in accordance with the present invention, in which elements similar to those shown in FIG. 1 are given the same Reference Numerals, the embodiment of the color signal processing circuit includes, in addition to the voltage controlled oscillator 1, the APC detector 2, the phase shifter 4 and the killer detector 5 which are common to the prior art example, a gate control signal generating circuit 3 receiving the PAL/NTSC switching signal "P", the phase inverting pulse "R" and the gate pulse "G", for generating gate control signals GA and GK which are in synchronism with the gate pulse G and which are used to alternately operate the APC detector 2 and the killer detector 5, one for one horizontal period and the other for a next one horizontal period.

Figure 5:
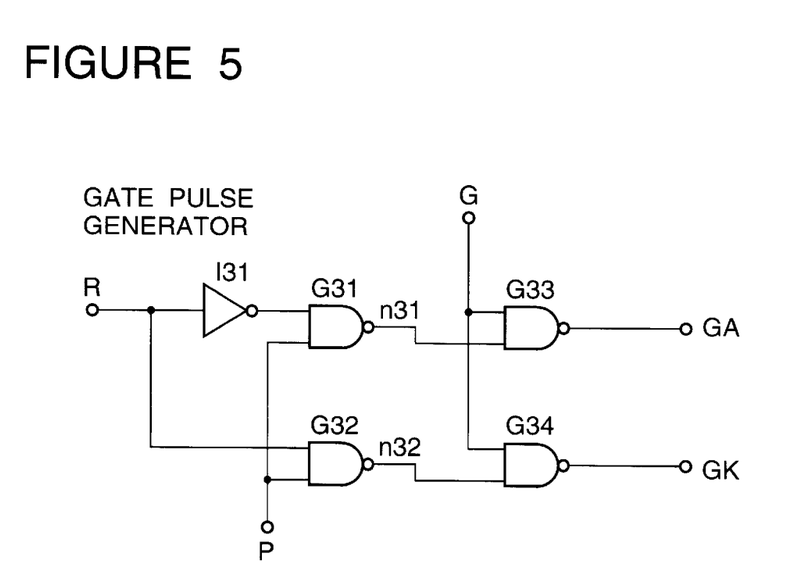
FIG. 5 is a circuit diagram illustrating a construction of a gate control signal generating circuit incorporated in the circuit shown in FIG. 4.

Referring to FIG. 5 which is a circuit diagram showing one example of a construction of the gate control signal generating circuit 3, the gate control signal generating circuit 3 comprises an inverter 131 inverting the phase inverting pulse "R" to generate an inverted phase inverting pulse "IR", an NAND gate G31 performing a NAND logic operation between the inverted phase inverting pulse "IR" and the PAL/NTSC switching signal "P", for outputting a signal "n31", another NAND gate G32 performing a NAND logic operation between the phase inverting pulse "R" and the PAL/NTSC switching signal "P", for outputting a signal "n32", an AND gate G33 performing an AND logic operation between the gate pulse "G" and the signal "n31", for outputting the gate control signal GA, and another AND gate G34 performing an AND logic operation between the gate pulse "G" and the signal "n32", for outputting the gate control signal GK.

Now, operation of the gate control signal generating circuit 3 will be described with reference to FIG. 5. The phase inverting pulse "R" is divided into two paths, in one of which the phase inverting pulse "R" is inverted by the inverter 131 to generate the inverted phase inverting pulse "R", which is supplied to the NAND gate G31. In the other path, the phase inverting pulse "R" is supplied to the NAND gate G32 without modification. The NAND gate G31 supplies the AND gate G33 with the signal "n31" indicative of the result of the NAND logical operation between the signal "IR" and the PAL/NTSC switching signal "P". The AND gate G33 performs the AND logic operation between the signal "n31" and the gate pulse G to generate the gate control signal GA, which is supplied to the APC detector 2. On the other hand, the NAND gate G32 supplies the AND gate G34 with the signal "n32" indicative of the result of the NAND logical operation between the signal "R" and the signal "P". The AND gate G34 performs the AND logic operation between the signal "n32" and the gate pulse G to generate the gate control signal GK, which is supplied to the killer detector 2.

Figure 6A:
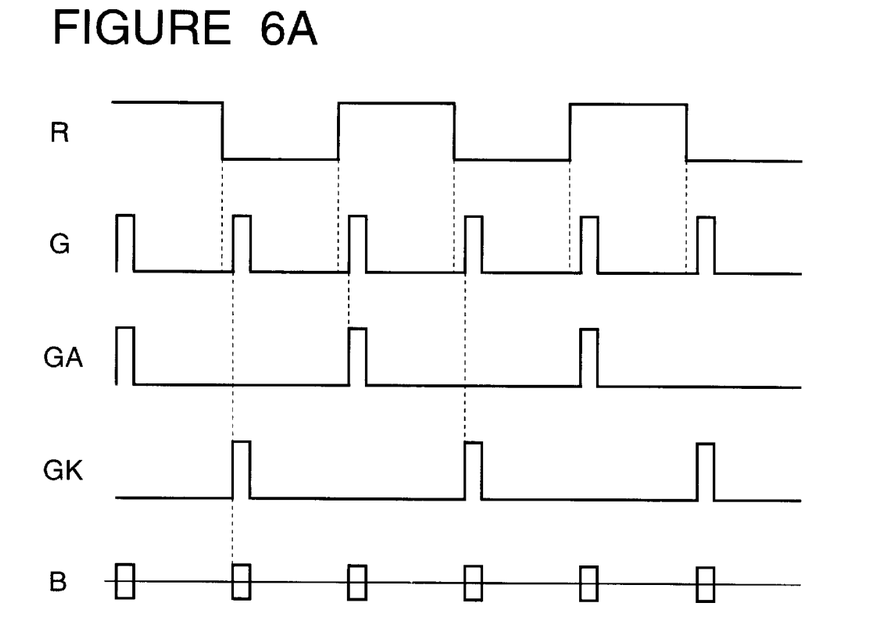
FIGS. 6A and 6B are timing charts illustrating examples of an operation of the gate control signal generating circuit shown in FIG. 5.

Referring to FIG. 6A, which is a time chart of the phase inverting pulse "R", the gate pulse "G", the gate control signals GA and GK and the burst signal "B" in the NTSC signal receiving mode in which the PAL/NTSC switching signal "P" is at the high level "H", the APC detector 2 and the killer detector 5 alternately operate only during the period of the burst signal "B", one for one horizontal period and the other for a next one horizontal period.

Figure 6B:
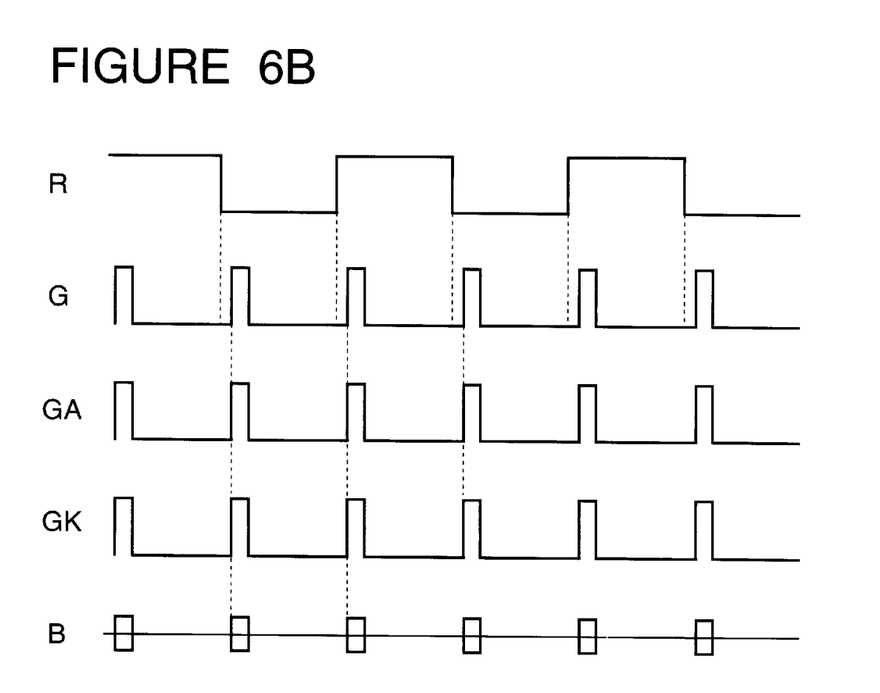

Referring to FIG. 6B, which is a time chart of the phase inverting pulse "R", the gate pulse "G", the gate control signals GA and GK and the burst signal "B" in the PAL signal receiving mode in which the PAL/NTSC switching signal "P" is at the low level "L", both the APC detector 2 and the killer detector 5 simultaneously operate only during the period of the burst signal "B" of each one horizontal period.

Next, operation of this embodiment will be described with reference to FIG. 4. As mentioned above, the gate control signal generating circuit 3 responds to the PAL/NTSC switching signal "P" and the phase inverting pulse "R", to generate the gate control signals GA and GK which are in synchronism with the gate pulse G and which alternately operate the APC detector 2 and the killer detector 5, one for one horizontal period and the other for a next one horizontal period. The gate control signals GA and GK are supplied to the APC detector 2 and the killer detector 5, respectively. In the NTSC signal receiving mode, the phase shifter 4 outputs the subcarrier phase-shifted as compared with the phase of the APC input signal "S" by +90°, as the killer input signal "J". In the PAL signal receiving mode, the phase shifter 5 further changes the phase of the subcarrier in response to the PAL/NTSC switching signal "P" and the phase inverting signal "R", so as to output, as the killer input signal "J", a signal obtained by alternatively inverting and non-inverting the subcarrier phase-shifted as compared with the phase of the APC input signal "S" by +135°, from one horizontal period to another.

Figure 7A:
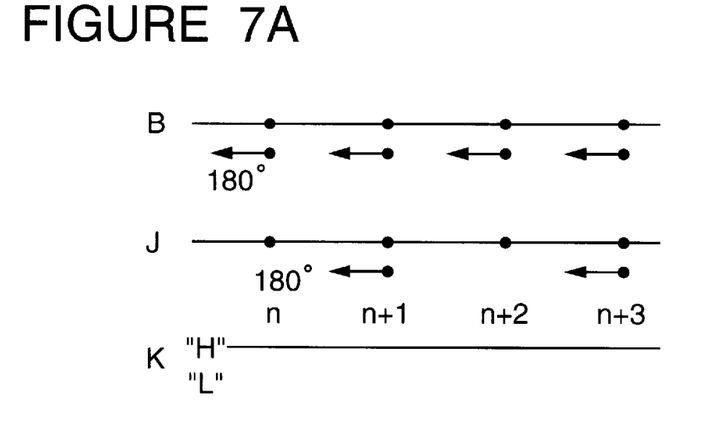
FIGS. 7A to 7E are operation diagrams illustrating different phase relations between various signals in the embodiment of the color signal processing circuit.

Here, reference is furthermore made to FIGS. 7A to 7E, which are operation diagrams illustrating the operation of the embodiment of the color signal processing circuit. In these drawings, "n", "n+1", "n+2", * * * indicate an (n)th horizontal period, an (n+1)th horizontal period, an (n+2)th horizontal period, * * * , respectively, similarly to the prior art example. In FIG. 7A showing the case in that an NTSC signal is inputted in the NTSC signal receiving mode, since the phase of the burst signal "B" is always at a constant value of 180° for all the horizontal periods, the phase of the APC input signal "S" becomes 90°. The APC detector 2 and the killer detector 5 are controlled by the gate control signal generating circuit 3 to alternately operate, one for one horizontal period and the other for a next one horizontal period. For example, assuming that the APC detector 2 operates in the (n)th horizontal period, the killer detector 5 operates in the (n+1)th horizontal period.

Since the phase of the killer input signal "J" is always at 180° when the phase of the APC input signal "S" is 90°, the signals "B" and "J" are in the same phase when the killer detector 5 operates. Therefore, the killer detector 5 outputs the killer detection signal "K" of a high level "H".

Figure 7B:
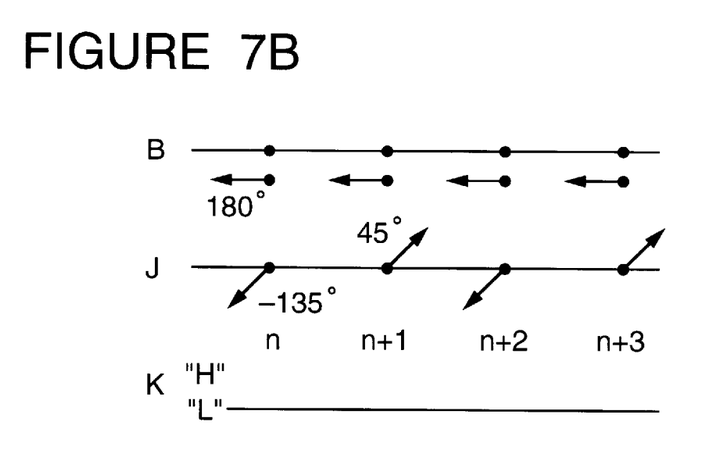

In FIG. 7B showing the case in that a NTSC signal is inputted in the PAL signal receiving mode, since the phase of the burst signal "B" is always at a constant value of 180°, the APC input signal "S" is locked to 90°. Therefore, the phase of the killer input signal "J" alternately assumes −135° and 45°, one for one horizontal period and the other for a next one horizontal period. For example, assuming that the phase of the (n)th killer input signal "J" is −135°, the phase of the (n+1)th killer input signal is 45°. Therefore, the (n)th and (n+1)th killer detection outputs "K" are at the same value but opposite in polarity to each other. Accordingly, if the detection output "K" is caused to pass on the smoothing capacitor, these outputs are cancelled so that the killer detector 5 outputs the killer detection signal "K" of a low level "L".

When a PAL signal is inputted in the NTSC signal receiving mode, the phase of the burst signal "B" alternately assumes 135° and −135°, one for one horizontal period and the other for a next one horizontal period, and the killer detector 5 operates every other horizontal period. Now, an operation of the killer detector 5 when the phase of the burst signal "B" assumes −135° and 135°, respectively, will be described with reference to FIGS. 7C and 7D. In both the cases, as will be explained hereinafter, the burst signal "B" and the killer input signal "J" are orthogonal to each other, so that the killer detector 5 outputs the killer detection signal "K" of a low level "L".

Figure 7C:
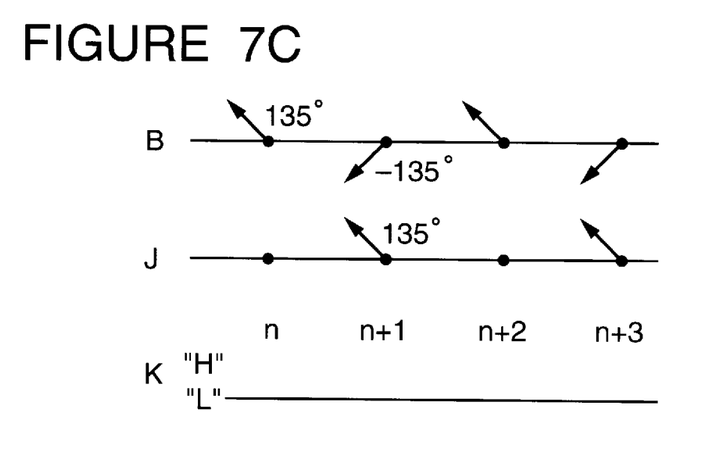

In FIG. 7C, when the phase of the burst signal "B" is −135° in the (n+1)th horizontal period, the killer detector 5 operates, and on the other hand, since the APC detector 2 operates during the (n)th horizontal period, the APC input signal "S" is locked to the phase of 45° on the basis of the phase of 135° of the (n)th burst signal "B". The phase of the killer input signal "J" becomes 135° in response to the phase of 45° of the APC input signal "S", however, the killer detector 5 is put in a non-operating condition during this (n)th horizontal period. On the other hand, the killer detector 5 operates during the (n+1)th horizontal period, but since the APC detector 2 is put in the non-operating condition, the killer input signal "I" having the phase of 135° which was during the (n)th horizontal period, is applied to the killer detector 5. Since the phase of the (n+1)th burst signal "B" is −135°, the phase of the (n+1)th burst signal "B" is orthogonal to the killer input signal "J". Thus, the killer detection signal "K" becomes a low level "L".

Figure 7D:
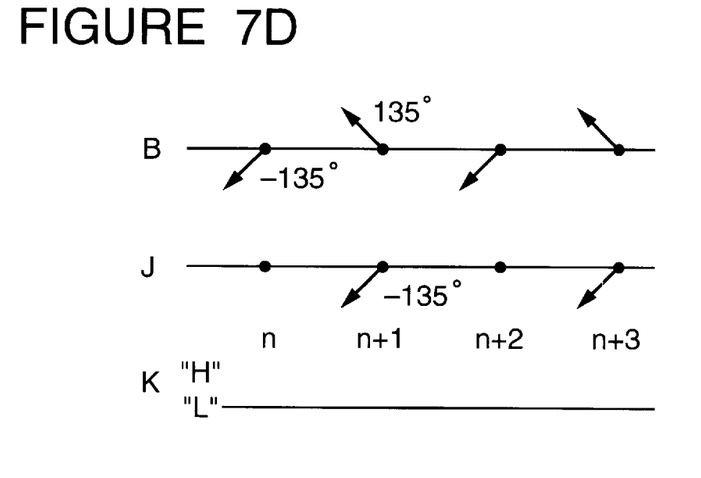

In FIG. 7D, when the phase of the burst signal "B" is 135° in the (n+1)th horizontal period, the killer detector 5 operates, and on the other hand, since the APC detector 2 operates during the (n)th horizontal period in which the killer detector 5 is in the non-operating condition, the APC input signal "S" is locked to the phase of 135° on the basis of the phase of −135° of the (n)th burst signal "B". The phase of the killer input signal "J" becomes −135° in response to the phase of 135° of the APC input signal "S". During the next (n+1)th horizontal period, since the APC detector 2 is put in the non-operating condition, the killer input signal "J" having the phase of 135° which was during the (n)th horizontal period, is applied to the killer detector 5. Since the signals "B" and "J" are orthogonal to each other. Thus, the killer detection signal "K" becomes a low level "L", similarly.

Figure 7E:
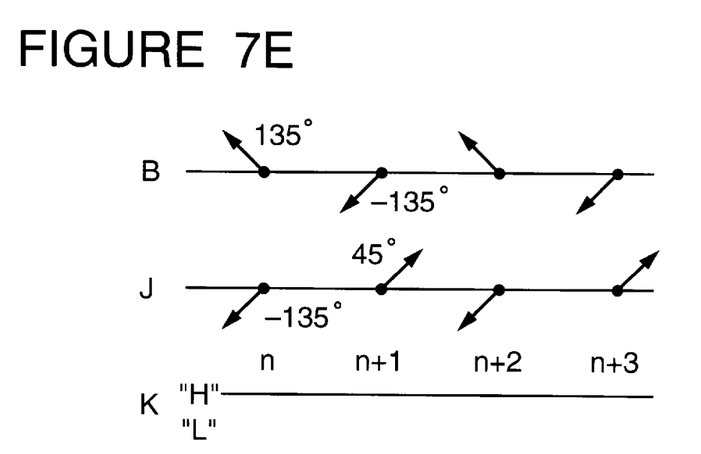

In FIG. 7E showing the case in that a PAL signal is inputted in the PAL signal receiving mode, the phase of the burst signal "B" alternately assumes 135° and −135°, one for one horizontal period and the other for a next one horizontal period. In this case, since the APC detector 2 operates during all the horizontal periods, the phase of the APC signal "S" is always locked at 90° because an averaged phase of the burst signals "B" is recognized to be 180°. Accordingly, the killer input signal "J" alternately assumes −135° and 45°, one for one horizontal period and the other for a next one horizontal period. Here, assuming that the phase of the (n)th burst signal "B" is 135° and the phase of the killer input signal "J" is −135°, the signals "B" and "J" are orthogonal to each other during the (n)th horizontal period. However, during the (n+1)th horizontal period, the phase of the burst signal "B" is −135° and the phase of the killer input signal "J" is 45°, so that these signals are opposite in polarity to each other. If the output is caused to pass on the smoothing capacitor, the output level becomes uniform, and the killer detector 5 outputs the killer detection signal "K" of a high level "H".

The embodiment of the present invention has thus been shown and described, however, the present invention is in no way limited to the details of the illustrated embodiment, but various changes and modifications are possible. For example, the gate control signal generating circuit has been constructed of a combination of NAND gates and AND gates. However, it is a matter of course that the gate control signal generating circuit is in no way limited to this construction, but can be composed by using other logic circuits which can perform the same logical operation, within the spirit of the invention.

As described above, the color signal processing circuit in accordance with the present invention is characterized by additionally comprising the gate control signal generating circuit for alternately generating a gate control signal for the APC detector and another gate control signal for the killer detector, one for one horizontal period and the other for a next one horizontal period, in response to application of a phase inverting pulse. With this arrangement, in the NTSC signal receiving mode, the APC detector and the killer detector are controlled to alternately operate, one for one horizontal period and the other for a next one horizontal period. Therefore, when the PAL signal is inputted in the NTSC signal receiving mode, the output of the killer detector is inhibited, so that the processing is clearly distinguished from the case that the NTSC signal, which is of the same system as that of the receiving mode, is inputted. Thus, it is possible to prevent deterioration of the image quality caused by occurrence of the striped pattern due to the chromatization of the image.

We claim:

1. A color signal processing circuit comprising an APC detector detecting a phase difference between a burst signal and a first subcarrier in response to application of a first gate control signal, for outputting an APC detection signal; a voltage controlled oscillator for generating an oscillation signal having an oscillation frequency controlled in response to application of said APC detection signal; a phase shifter for outputting said first subcarrier in response to application of said oscillation signal and also for generating a second subcarrier having its phase orthogonal to that of said first subcarrier, and a killer detector for generating a killer detection signal which is a result of a calculation of a cosine of a phase difference between said second subcarrier and said burst signal, in response to application of a second gate control signal, wherein there is provided a gate control signal generating circuit for alternately generating said first gate control signal and said second gate control signal, one for one horizontal period and the other for a next one horizontal period, in response to application of a phase inverting pulse which alternately inverts in its polarity from one horizontal period to another.

2. A color signal processing circuit claimed in claim 1 wherein said gate control signal generating circuit includes:

an inverter inverting said phase inverting pulse to generate an inverted phase inverting pulse;

a first NAND gate performing a NAND logic operation between said inverted phase inverting pulse and a switching signal, for outputting a first NAND signal;

a second NAND gate performing a NAND logic operation between said phase inverting pulse and said switching signal, for outputting a second NAND signal;

a first AND gate performing an AND logic operation between a gate pulse having a predetermined pulse width and said first NAND signal, for outputting said first gate control signal; and a second AND gate performing an AND logic operation between said gate pulse and said second NAND signal, for outputting said second gate control signal.

* * * * *